UNITED STATES PATENT OFFICE.

EDGAR S. STODDARD, OF CHICAGO, AND CARL S. MINER, OF GLENCOE, ILLINOIS, ASSIGNORS TO ARMOUR GRAIN COMPANY, OF CHICAGO, ILLINOIS, A CORPORATION OF ILLINOIS.

PRECOOKED FOOD.

1,402,108.     Specification of Letters Patent.     Patented Jan. 3, 1922.

No Drawing.     Application filed August 5, 1920. Serial No. 401,367.

*To all whom it may concern:*

Be it known that we, EDGAR S. STODDARD and CARL S. MINER, citizens of the United States, residing, respectively, at Chicago and Glencoe, Illinois, have invented certain new and useful Improvements in a Precooked Food, of which the following is a specification.

The present invention has to do with the production of a precooked article of food which, by the addition of hot water or milk, may be quickly made ready to serve.

While applicable with a greater or less degree of success to natural food materials containing a considerable percentage of starch, we have found a most palatable product to result from the use of ordinary white or Irish potatoes as a basis, and we have, therefore, chosen to describe the invention as applied to the treatment of such material to produce a stock for what is commonly known as mashed potatoes.

The preliminary steps of the treatment are the same as those ordinarily employed in the preparation of potatoes for mashing. The raw material is first washed and peeled, care being taken to remove all the eyes and bad parts. It is then sorted and cut so that all the pieces are about the same size, averaging about two inches in length by one and one-half inches in diameter. These are washed to rid them of the last traces of muddy water and then put in a kettle and covered with hot water, usually at about fifty degrees centigrade. The time of boiling varies with the material but it is usually about fifty minutes. The cooking should continue to the point where the potatoes are just beginning to disintegrate and to break up. It is better to have them cooked a little past this point rather than to remove them too soon; but they should not be allowed to become mushy.

After cooking, the potatoes are taken from the cooker, the water drained off and then put in a press where the excess water is removed. At this time the water content is usually about eighty per cent. in the pieces of still unbroken material. The pressing process removes the water until the moisture content is seventy-five per cent. or less varying with the material and the size of the press. The potatoes should be left in the press long enough so that the water has been given time to drain from the outer surfaces, as these are the last parts affected by the process and carelessness here will cause the product to be non-uniform.

The resultant cake is placed in a feed hopper with as little breakage as possible so as to maintain the compactness of the material. From the hopper the potato cake is squeezed through a metal die onto a continuous moving belt, the material dropping in single layers of string-like pieces or filaments of three thirty-seconds to one-eighth of an inch in diameter. Resting upon the belt, the filaments are moved through a tube or casing in opposition to a stream of hot air in contact with the material.

The initial and final temperatures, the length of time in the tubular oven required for complete drying and the amount of draft all depend upon each other and the construction of the oven. The stream of air is baffled in such a manner that it passes over, under and through the belt at different points along the route. We have found that satisfactory results follow a drying for thirty-five minutes at an initial temperature of forty-five degrees centigrade and a final temperature of one hundred thirty-five degrees centigrade. We have also prepared material by subjecting the same for fifteen minutes at temperatures ranging from seventy degrees centigrade to two hundred fifteen degrees centigrade. If desired, the initial temperatures stated can be reduced by varying the time of drying. In practice, drying would, perhaps, be best effected by subjecting the material for a period of from twenty to thirty-five minutes to a gradually increasing dry heat ranging from forty degrees to one hundred fifty degrees centigrade or more.

The material should be discharged from the oven crisp and white. The filaments should be substantially straight, round, reasonably smooth, and they will be found to have a tubular bore extending throughout their length in the center. The filaments are not tubular when discharged upon the belt, but this opening or lumen through the center apparently results from contraction during drying. The moisture content at the end of the drying should be in the neighborhood of from five to six or seven per cent.

This product, thoroughly cooked, desiccated, crisp and white, will keep indefinitely when packaged.

To prepare mashed potatoes for serving, it is only necessary to add to each cup of the precooked potatoes a teaspoonful of butter and a cup of boiling mixture of milk and water, or water alone, permit the material covered by the hot water or milk and water to stand for about two minutes, add salt and pepper, then beat thoroughly as in preparing ordinary mashed potatoes, and serve.

We claim:

1. The method of preparing precooked starchy foods such as potatoes, which consists in cooking to disintegration with moist heat, compacting to remove excess moisture, forming the resultant cake into filaments, and subjecting the filaments to a gradually increasing dry heat to desiccate the same.

2. The method of preparing precooked starchy foods such as potatoes, which consists in cooking to disintegration with moist heat, compacting to remove excess moisture, forming the resultant cake into filaments by extrusion, and subjecting the filaments to a gradually increasing dry heat ranging from forty degrees to one hundred fifty degrees centigrade.

3. The method of preparing precooked starchy foods such as potatoes, which consists in cooking to disintegration with moist heat, compacting to remove excess moisture, forming the resultant cake into filaments by extrusion, and subjecting the filaments to a gradually increasing dry heat ranging to two hundred fifteen degrees centigrade for a period of from fifteen to thirty-five minutes.

4. A precooked food product in the form of a desiccated tubular filament having its lumen formed by the process of desiccation and containing a substantial percentage of starch.

5. A precooked food product in the form of a desiccated potato filament, the filament tubular in form as the natural result of drying to distinguish from mechanical shaping.

6. A precooked food product in the form of a desiccated tubular white potato filament.

7. A precooked food product in the form of a thoroughly cooked tubular white potato filament approximately three thirty-seconds of an inch in diameter and containing from five to seven per cent. of moisture.

8. A precooked desiccated mashed potato material in the form of tubular filaments characterized by the fact that by mere contact with hot water it is transformed into a coherent mass the same as mashed potatoes prepared in the ordinary way.

9. A precooked stock for the preparation of mashed potatoes comprising desiccated tubular filaments of white potato, thoroughly cooked, white, characterized by the fact that by mere contact with hot water it is transformed into a coherent mass the same as mashed potatoes prepared in the ordinary way.

10. The method of preparing precooked starchy foods such as potatoes, which consists in cooking to disintegration with moist heat, compacting to remove excess moisture, forming the resultant cake into filaments by extrusion, and forming a lumen extending longitudinally through said filaments by subjecting them to heat.

11. The method of preparing precooked starchy foods such as potatoes, which consists in cooking to disintegration with moist heat, compacting to remove excess moisture, forming the resultant cake into filaments by extrusion, and forming a lumen extending longitudinally through said filaments by subjecting them to a gradually increasing dry heat ranging from 40° to 150° centigrade.

In testimony whereof we have signed our names in the presence of two subscribing witnesses.

EDGAR S. STODDARD.
CARL S. MINER.

Witnesses for Stoddard:
MOLLIE GROW,
S. E. PETERSON.

Witnesses for Miner:
ALICE D. MINER,
CARSON WARNER.